(No Model.) 3 Sheets—Sheet 1.

J. L. RITER.
FORCE FEED SEEDING MACHINE.

No. 317,204. Patented May 5, 1885.

WITNESSES
INVENTOR John L. Riter
ATTORNEY (No Model.) 3 Sheets—Sheet 2.
J. L. RITER.
FORCE FEED SEEDING MACHINE.
No. 317,204. Patented May 5, 1885.
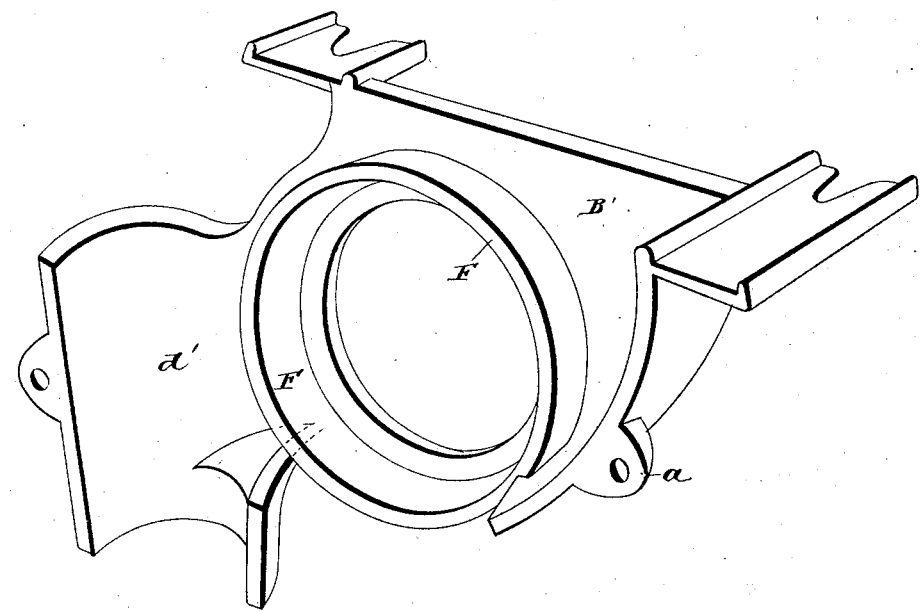
*Fig. 2.*
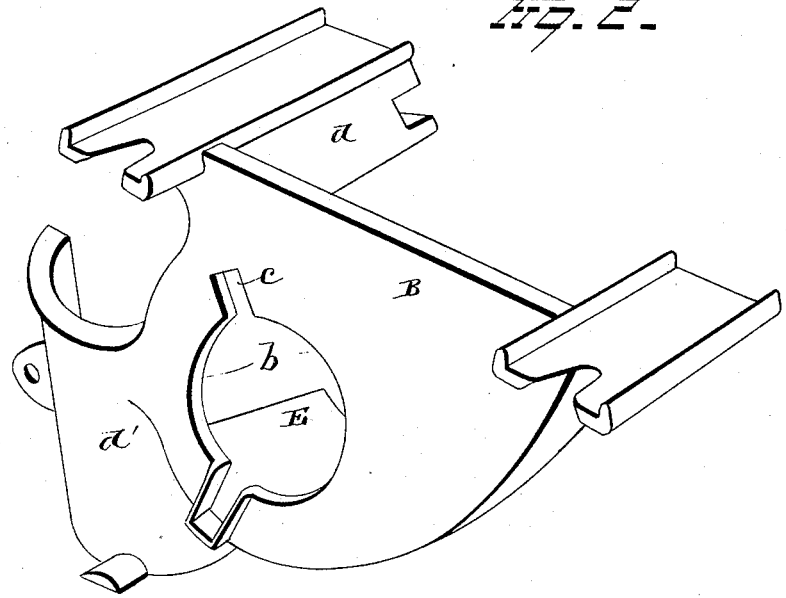
WITNESSES
E. Nottingham
Geo. F. Downing
INVENTOR
John L. Riter.
B. A. Seymour
ATTORNEY (No Model.) 3 Sheets—Sheet 3.
J. L. RITER.
FORCE FEED SEEDING MACHINE.

No. 317,204. Patented May 5, 1885.

WITNESSES
INVENTOR
John L. Riter
ATTORNEY

United States Patent Office.

JOHN L. RITER, OF BROWNSVILLE, INDIANA.

FORCE-FEED SEEDING-MACHINE.

SPECIFICATION forming part of Letters Patent No. 317,204, dated May 5, 1885.

Application filed December 23, 1884. (No model.)

*To all whom it may concern:*

Be it known that I, JOHN L. RITER, of Brownsville, in the county of Union and State of Indiana, have invented certain new and useful Improvements in Force-Feed Seeding-Machines; and I do hereby declare the following to be a full, clear, and exact description of the invention, such as will enable others skilled in the art to which it appertains to make and use the same.

My invention relates to an improvement in force-feed seeding-machines, the object of the same being to provide devices by means of which the discharge of seed is rendered uniform in its outflow; and with this end in view my invention consists in the parts and combinations of parts, as will be more fully described, and pointed out in the claims.

Figure 1:
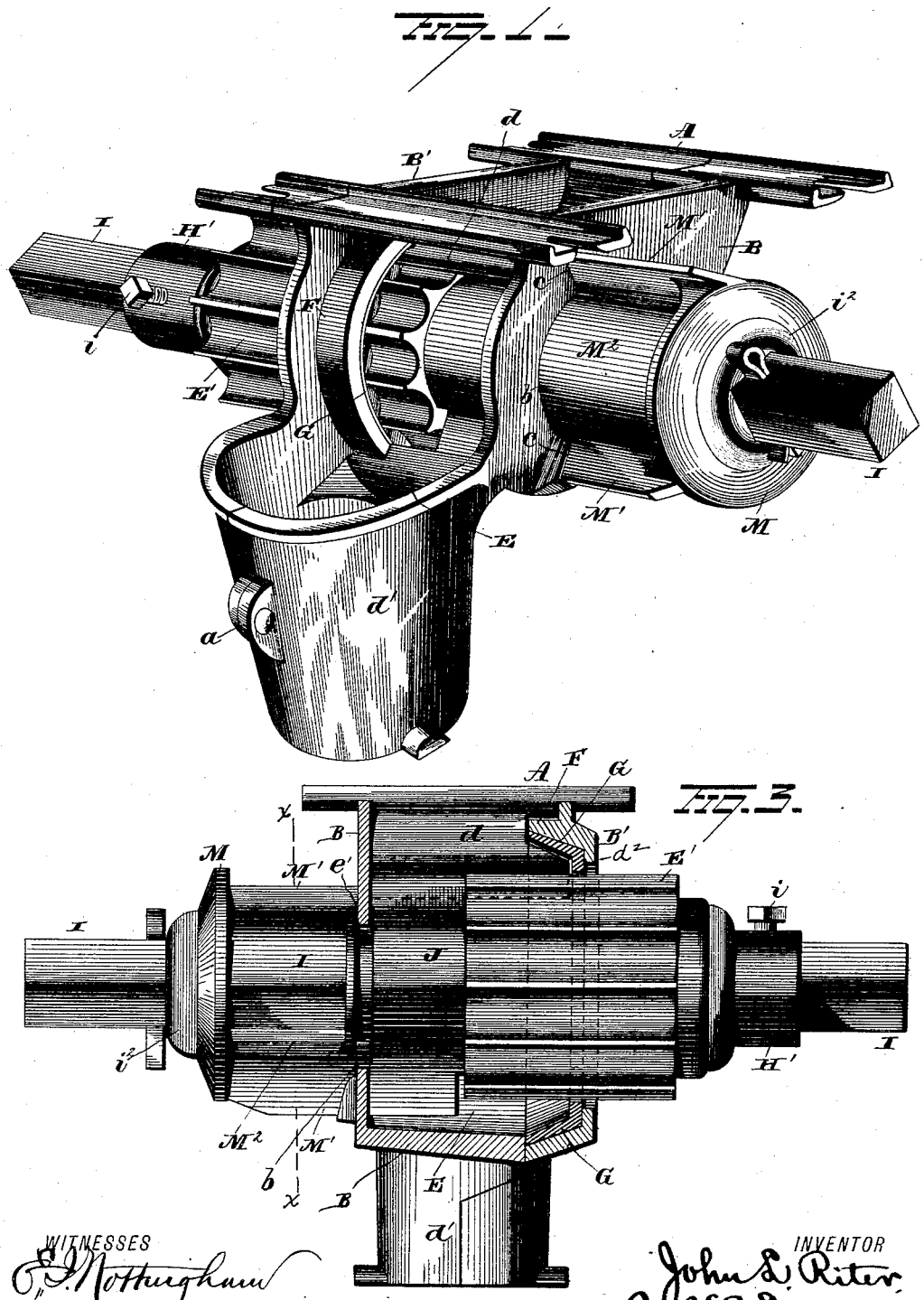
Figure 4:
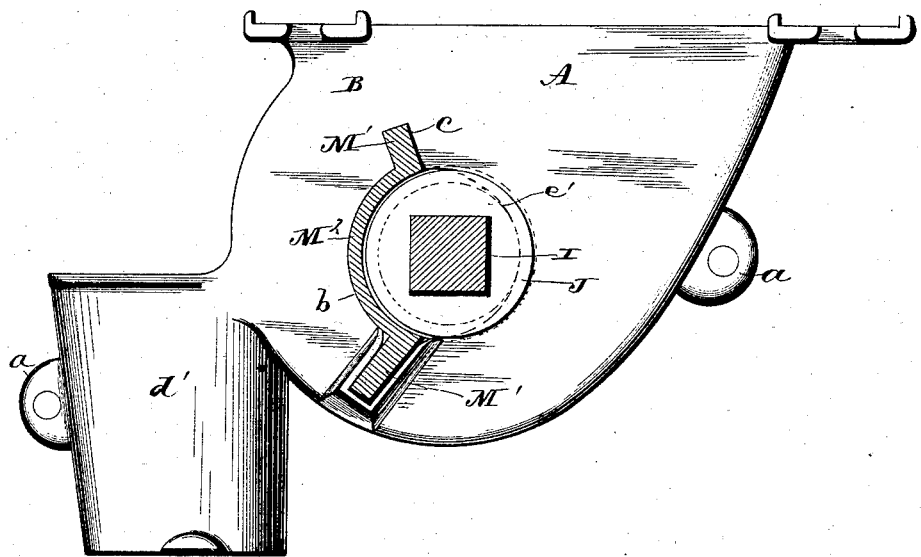

In the accompanying drawings, Figure 1 is a view in perspective of my improved device. Fig. 2 is a view of the seed-cup, the sections being detached. Fig. 3 is a view in transverse vertical section of the cup; and Fig. 4 is a sectional view on the line $x$ $x$ of Fig. 3, showing the manner of securing the sleeve in position.

A represents the seed-cup, made in two sections, B' B, each of which latter is provided with one or more projection lugs, $a$, through which rivets are passed for the purpose of securing the sections together. The section B is provided at a point over the feed-wheel with a rigid depending gate, $d$, adapted to prevent the seed from passing out over the feed-wheel, and with an opening, $b$, through which the shaft I and sleeve J pass. This section is also provided with slots $c$, communicating with the opening $b$, in which the adjustable gates rest and move, with the oblique lip E, over which the grain is discharged, and with a section of the spout $d'$, into which the seed falls after it leaves the oblique discharge-lip, E. The discharge-lip E, over which the grain is discharged, does not extend the full width of the cup, but terminates at the outer edge of the rim formed on the section B', while rigid gate $d$, above referred to, projects under said rim and rests in close proximity to the rose-washer. The section B' conforms in shape to the section B, and is provided with an opening sufficiently large for the passage of the force-feed wheel E', and on its inner face, immediately around the opening therein, with an inwardly-projecting cylindrical flange, F, which latter forms a seat or guide for the rose-washer, and with a section of the spout $d'$. This rose-washer is fluted to correspond with the corrugations of the feed-wheel, and closely embraces said wheel and prevents the escape of any seed at the end, and is provided with a peripheral rim or flange, G, which latter rests closely within the cylindrical flange and revolves simultaneously with the feed-wheel, and assists the latter in elevating the grain and discharging it over the lip E. The rose-washer, with its attached rim G, is prevented from lateral displacement by the flange $d^2$ of the section B' and by the section B, the floor of which latter is on a line with the inner surface of the rim G. The rigid depending gate $d$ of the section B also assists in preventing the displacment of the rose-washer.

I would have it understood that I do not confine myself to a fluted wheel and correspondingly-fluted rose-washer, as the washer for use in connection with a pin-feed, or any other force-feeding device, can be employed and accomplish the same results. The two parts of the cup, with the inclosed rose-washer, are secured together and adapted to receive a rotating and sliding shaft, I, on which is rigidly secured a force-feed wheel, E', and on which are mounted the gates M', which latter move longitudinally with the shaft and with the force-feed wheel secured on said shaft, and increases or diminishes the size of the discharge-openings as necessity demands.

H' is a flanged collar provided with a bore or opening corresponding in shape and size to a cross-section of the shaft I, and with a screw-threaded opening for set-screw $i$, which latter is adapted to secure the collar to the shaft. The flanged end of this collar rests in contact with the outer end of the feed-wheel E', and prevents said wheel from moving longitudinally on the shaft in one direction, while the gates M', which bear against the opposite end of said feed-wheel and are held in position by a similar collar, $i^2$, secured on the shaft against the hub M of the gates M', prevent movement in the opposite direction. By arranging the gates and feed-wheel on the shaft in contact with each other, and securing a collar on the shaft against the outer end of the feed-wheel and a collar on the shaft against the outer face of the hub of the cut-off gates, the said wheel and cut-off gates, are retained on the shaft against independent longitudinal movement.

The collar $i^2$, which rests against the hub of the cut-off gates, is provided with an inwardly-projecting cylindrical portion, forming a bearing on which the hub M of the gates M' rest.

While I have described the collars as being secured to the shaft by set-screws, it is evident that they can be secured thereto equally as well by pins either passing through the collars and shaft or through the shaft in close contact with the outer ends of the collars. The shaft I is revolved by any suitable means, and also has an independent sliding movement by means of which the force-feed wheel and gates are moved longitudinally. This shaft is preferably angular and extends approximately the length of the hopper, and is provided with a pinion, (not shown,) through which rotary motion is imparted to the shaft. The shaft slides through or in this pinion and operates the feed-wheel, cut-off gates, and sleeve J. This sleeve J extends the width of the seed-chamber, and is provided at one end with a peripheral groove, $e'$, slightly wider than the thickness of the side wall of the section B of the seed-cup, and with a central bore corresponding in shape to the shaft I, through which the shaft passes. The opening $b$ of the section B is of irregular shape and somewhat larger than the diameter of the sleeve J, for the purpose of permitting the latter to be passed through the opening. The portion of the opening $b$ in front of the slots $c$ is made concentric with the sleeve, so as to form a bearing therefor, while the portion of said opening behind the slots $c$ is formed concentric with the web $M^2$ of the cut-off gates, the said web being formed integral with the hub M and cut-off gates M'. The sleeve is first passed through the opening until the peripheral groove therein is in a line with the side wall of the section B of the cup. The sleeve is then moved forwardly, so as to bring the wall of the section B within the slot in the sleeve. The gates, with the intermediate web, are then passed into the opening $b$ and hold the sleeve in position. By thus journaling the sleeve within the seed-cup and loosely connecting the sleeve and cut-off gates to the shaft, the shaft, with its attached gates and feed-wheel, can be moved endwise without disturbing the position of the sleeve, and can be rotated without disturbing the cut-off gates.

The feed-wheel E' consists, essentially, of a hollow cylindrical block provided with grooves or pockets on its periphery, which latter register with the openings in the rose-washer. The outer or hub end of this wheel is provided with a bore corresponding in shape and size to the shaft I, so as to cause the wheel to rotate simultaneously with the shaft. The inner end of this feed-wheel is hollowed out to permit the latter to slide on or over the sleeve J, which, as before stated, is journaled in one side wall of the feed-cup. When the feed-wheel is wholly within the seed-chamber, the sleeve is entirely covered; but when the wheel is partly withdrawn from the seed-chamber a portion of the sleeve is exposed, and, as the latter revolves with the feed-wheel, the grain is not crushed or otherwise injured. As the gates and feed-wheel assist in holding each other against endwise movement, when one is moved the other follows; hence when the feed-wheel is partly withdrawn from the seed-chamber the gates enter said chamber and partly close the discharge-opening, and when the feed-wheel is wholly withdrawn the gates close the entire opening and shut off the feed.

When the machine is in operation, the rotary shaft actuates the feed-wheel, and the latter actuates the flanged washer. As a portion of the grain rests between the flange on the washer and the feed-wheel, the combined movement of the parts carries the grain up to the discharge-opening, and as no friction is created or encountered between the seed and the cup, the discharge is constant and uniform, and the seed is prevented from bridging. A portion of the force-feeding wheel always rests within the flange of the washer, except when the cup is entirely closed by the gates, and hence the parts when working are always in position to assist each other.

For the purpose of securely holding the two sections of the cup together, I construct their meeting-edges with interlocking and registering recesses and projections, whereby each section assists in supporting the other.

I would have it understood that I do not confine myself to a sliding shaft, as a non-sliding shaft with independent devices for sliding the gates and feed-wheel could be employed and answer all purposes. It is also evident that other slight changes in the construction might be resorted to without departing from the spirit of my invention, and hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. The combination with the following elements, to wit: a force-feed seed-cup, a force-feed seed-wheel, devices for graduating the flow of seed, and a revolving washer having a rim surrounding the force-feed wheel and operating in conjunction therewith.

2. In a force-feed seeding-machine, the combination, with a force-feed wheel and a gate or gates for regulating the discharge, of a revolving rose-washer having a rim surrounding said wheel, and adapted to render uniform the discharge of the seed propelled toward the discharge-point of the seed-cup by said force-feed wheel.

3. In a seeding-machine, the combination, with a seed-cup, of a force-feed seed-wheel and a rotating washer having an inwardly-projecting rim acting in conjunction with the seed-wheel.

4. The combination, with a seed-cup having an oblique discharge-lip, of a force-feed seed-wheel, and a rotating washer having an inwardly-projecting rim acting in conjunction with the seed-wheel, substantially as set forth.

5. The combination, with a rotating and sliding shaft, and a force-feed wheel secured thereon, of a rotating washer having an inwardly-projecting rim or flange located within the cup and actuated by the feed-wheel.

6. The combination, with a rotating and sliding shaft, of a flanged rose-washer actuated by the feed-wheel, and a feed-wheel secured to the shaft and actuating the flanged washer.

7. The combination, with a seed-cup and the flanged rose-washer, of the sleeve journaled in the side wall of the cup, a shaft passing through the sleeve, and a hollow feed-wheel secured to the shaft and adapted to partly or wholly embrace the sleeve, substantially as set forth.

8. The combination, with a seed-cup and a flanged rose-washer, of the sleeve journaled in the side wall of the cup, the gates connected by a web, which latter holds the sleeve in position in its bearings in the side wall, and a shaft for rotating the flanged washer, feed-wheel, and sleeve, substantially as set forth.

9. The combination, with a seed-cup, a shaft, and a force-feed wheel and a cut-off gate or gates mounted on said shaft in contact with each other, of a collar resting against the outer end of the feed-wheel and secured to the shaft, and a collar resting against the hub of the cut-off gates and secured to the shaft, substantially as set forth.

10. The combination, with a seed-cup, a shaft, and a force-feed wheel and cut-off gate or gates mounted on said shaft in contact with each other, of the collar secured to the shaft outside of the feed-wheel, and the collar secured to the shaft outside of the hub of the cut-off gate or gates and forming a bearing for said hub, substantially as set forth.

In testimony whereof I have signed this specification in the presence of two subscribing witnesses.

JOHN L. RITER.

Witnesses:
  A. O. HAMILTON,
  GEO. W. HEIM.